Nov. 10, 1970 G. W. CLEMENS, JR., ET AL 3,540,048

DEEP SPACE-MONITOR COMMUNICATION SATELLITE SYSTEM

Filed Oct. 19, 1966 7 Sheets-Sheet 1

INVENTORS
GEORGE W. CLEMENS, JR.
ALFRED C. MASCY

BY [signatures]

ATTORNEYS

DEEP SPACE-MONITOR COMMUNICATION SATELLITE SYSTEM

Filed Oct. 19, 1966 7 Sheets-Sheet 2

COMPARISON OF ORBITAL WEIGHTS & LAUNCH-VEHICLE PAYLOAD CAPABILITIES

INVENTORS
GEORGE W. CLEMENS, JR.
ALFRED C. MASCY

BY [signature]
[signature]
ATTORNEYS

Nov. 10, 1970 G. W. CLEMENS, JR., ET AL 3,540,048

DEEP SPACE-MONITOR COMMUNICATION SATELLITE SYSTEM

Filed Oct. 19, 1966 7 Sheets-Sheet 3

INVENTORS
GEORGE W. CLEMENS, JR.
ALFRED C. MASCY

BY [signature]
[signature]
ATTORNEYS

DEEP SPACE-MONITOR COMMUNICATION SATELLITE SYSTEM

Filed Oct. 19, 1966 7 Sheets-Sheet 4

INVENTORS
GEORGE W. CLEMENS, JR.
ALFRED C. MASCY

BY

ATTORNEYS

INVENTORS
GEORGE W. CLEMENS, JR.
ALFRED C. MASCY
BY [signature]
[signature]
ATTORNEYS

DEEP SPACE-MONITOR COMMUNICATION SATELLITE SYSTEM

INVENTORS
GEORGE W. CLEMENS, JR.
ALFRED C. MASCY

BY [signatures]

ATTORNEYS

INVENTORS
GEORGE W. CLEMENS, JR.
ALFRED C. MASCY
BY
ATTORNEYS 3,540,048

DEEP SPACE-MONITOR COMMUNICATION SATELLITE SYSTEM

George W. Clemens, Jr., Concord, and Alfred C. Mascy, Sunnyvale, Calif., assignors to the United States of America as represented by the Administrator of the National Aeronautics and Space Administration Filed Oct. 19, 1966, Ser. No. 588,651
Int. Cl. B64g 3/00; H04b 7/20
U.S. Cl. 343—100 16 Claims

ABSTRACT OF THE DISCLOSURE

This invention teaches the use of a single Earth orbiting relay communications satellite to eliminate the tracking occultation problems experienced by ground tracking stations continuously monitoring interplanetary missions. The tracking occultation experienced by ground tracking stations is caused by the Earth's rotation and atmosphere giving a constantly changing and distorted line-of-sight between the tracking station and the interplanetary mission being monitored. This problem is eliminated when using the relay satellite by the proper selection of the satellite's orbital parameters to give a minimum angular change between the line-of-sight between Earth and the space vehicle relative to the orbital plane of the satellite. This condition is achieved by placing the communications relay satellite in a nearly polar orbit, which has an orbital plane perpendicular to the line-of-sight between the Earth and the interplanetary space vehicle. Because most planetary missions are in the plane of the ecliptic, the continuously monitoring relay satellite requires an orbit which is perpendicular to the ecliptic plane and has a retrograde orbital precession rate equal to the rate of change of the line-of-sight of space mission with respect to Earth. For the major part of an interplanetary mission, the change in the Earth to mission vehicle line-of-sight is nearly constant. The small rate of change in the line-of-sight not compensated for by the satellite's orbital precession rate is easily corrected by steering the relay satellite's onboard antennas.

The invention described herein was made by employees of the United States Government and may be manufactured and used by or for the Government for governmental purposes without the payment of any royalties thereon or therefor.

This invention relates in general to space communications, and relates more particularly to satellites for communicating between Earth and deep space.

In communicating with vehicles journeying to deep space in the future, it is planned to employ a deep space instrumentation facility (DSIF) which will include at least three communications facilities spaced more or less equally around the Earth. Each of these facilities is provided with one or more large antennas which will provide communication between Earth and the spacecraft. There are a number of problems which arise from the use of these Earth-based antennas. One such problem is the size and weight required in the antenna structure to withstand distortion from temperature changes, wind, rain, snow, hail, gravity and accelerative forces. This high weight, in turn, requires a heavy duty, complex train and elevation drive system for smooth antenna tracking under adverse conditions.

An additional problem encountered with Earth-based communication facilities is the presence of the Earth's atmosphere, which seriously interferes with the antenna operation. When an antenna is tracking a spacecraft, it is necessary that the antenna track from a low angle, across the zenith and down to a low angle. The low angle is dependent upon how early the next antenna in the system is able to acquire the spacecraft and lock-on. This angular change is due to the Earth's rotation and is not avoidable except by increasing the number of tracking stations. As the antenna's elevation changes from 90 degrees, which is a minimum atmosphere path, toward 0 degrees, which is a maximum atmosphere path, the antenna efficiency goes down rapidly due to the increased noise temperature from the surroundings; in addition, the greater path length through the atmosphere attenuates the incoming signals.

In accordance with the present invention, it is proposed to utilize an Earth-orbiting satellite to perform the functions of a deep space instrumentation facility. While Earth-orbiting satellites for communication purposes are, of course, well known, and it has even been proposed generally to utilize such a satellite to communicate with a vehicle in deep space, there has been no teaching of the use of such a satellite in a carefully selected orbital path to provide maximum communication efficiency with a vehicle in deep space. According to this invention, an orbital plane and altitude is selected for the satellite so as to result in a minimum occultation of the tracked craft by the Earth and its atmosphere. In the preferred embodiment, a near-polar orbital plane is selected, and the precessing rate of this orbit is such that it approximately corresponds to the movement of the line of sight to the target vehicle, thus facilitating continuous tracking of the vehicle with a minimum of required movement of the satellite antenna. The altitude of this orbit is selected so as to provide maximum communication with the spacecraft, while avoiding radiation shielding problems which would result from orbits in the Van Allen radiation belt, and avoiding excessive launch requirements which would result from orbits above the Van Allen belt.

In accordance with another feature of this invention, the satellite is provided with an antenna structure which is in a furled or folded condition during a launch and the flight through the Earth's atmosphere, and which is unfurled or otherwise placed in operating position when the satellite reaches the desired orbital path.

The satellite may be of the receiver-relay type, in which it receives messages from the spacecraft and relays them to Earth; in this case, the power requirements for the radio portion are relatively small. Alternatively, the satellite may carry facilities to both receive messages from the spacecraft for relaying to Earth and to transmit messages to the spacecraft; in this case, the power requirements for the radio system are considerably increased.

Additionally, the satellite may be unmanned, with provision for servicing by a logistics vehicle at regular intervals, or the satellite may be manned, with facilities for replacing the crews and equipment at the required intervals.

It is therefore an object of this invention to provide a deep space communication system employing a single Earth-orbiting satellite.

It is a further object of the present invention to provide a deep space communication system employing a single Earth-orbiting satellite in a near-polar orbital plane.

It is an additional object of this invention to provide a deep space communication system employing a single Earth-orbiting satellite in a near-polar orbital plane, the rate of precession of the orbit corresponding approximately to the movement of the line of sight between the satellite and a target vehicle.

It is an additional object of this invention to provide a deep space communication system employing a single Earth-orbiting satellite in a near-polar orbital plane, the altitude of the orbit being selected to provide minimum occultation of a tracked spacecraft by the Earth and its atmosphere.

It is a further object of this invention to provide a deep space communication system employing a single Earth-orbiting satellite in a near-polar orbital plane, the satellite being provided with an antenna structure which is in a furled condition during launch of the satellite and which is unfurled when the satellite is in orbit, to provide communication with a craft in deep space.

Objects and advantages other than those set forth above will be readily apparent from the following detailed description when read in connection with the accompanying drawings, in which.

ORBIT SELECTION

One requirement in connection with communicating with a craft in deep space is that an antenna in space must look continuously at the spacecraft with a minimum occultation by Earth and its atmosphere. The orbit selected to meet this requirement is necessarily a compromise among several conflicting considerations. For example, the trajectories of target vehicles for most interplanetary missions will be nearly in the plane of the ecliptic; thus the antenna orbit plane should be nearly normal to the ecliptic plane. In addition, however, the orbit inclination should result in a precession rate that will nearly correspond to the movement of the line-of-sight to a target vehicle. Since these two conditions cannot always be satisfied, the orbit altitude should be sufficiently high to allow a reasonable field of view for an antenna and to reduce the aerodynamic drag. Conversely, the orbit should not be so high as to require a vehicle to have extended operation in the Van Allen radiation belts because of the weight of shielding required. Orbits above the radiation belts do not appear attractive since they require considerably greater booster energy, both initially and for subsequent logistic support.

Figure 1:
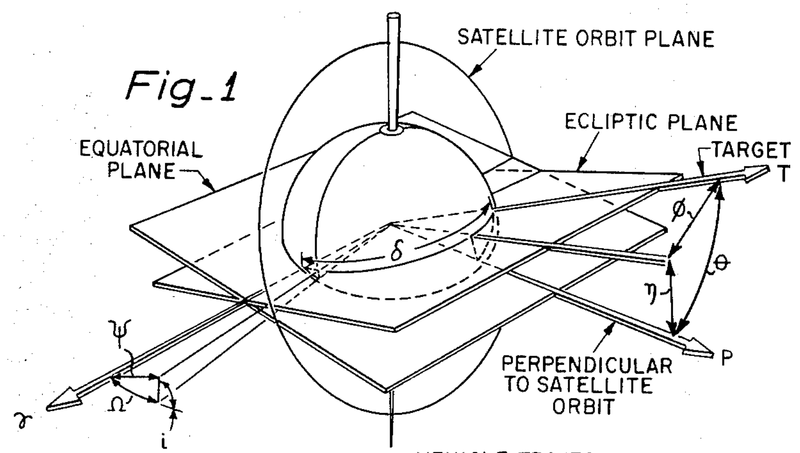
FIG. 1 is a perspective view illustrating the geometry associated with orbit selection in accordance with the present invention.

The geometry associated with this problem of orbit selection is shown in FIG. 1. In the present invention, the reference line for angle measurement was taken as the intersection of the equatorial and ecliptic planes ($\gamma$, the first point of Aries). The right ascension of the ascending node of the satellite orbit, which is measured in the equatorial plane is $\Omega$. The corresponding angle in the ecliptic plane is $\psi$. The line-of-sight to the target vehicle T, which is in the ecliptic plane, is at an angle $\delta$. The orbits of interest have inclinations $i$, slightly greater than 90° (i.e., they are retrograde and nearly polar). The perpendicular to the orbit plane P is at an angle $\theta$ with respect to the target T. This angle has two components $\phi$, in the ecliptic plane, and $\eta$, in the plane normal to the ecliptic.

Figure 2:
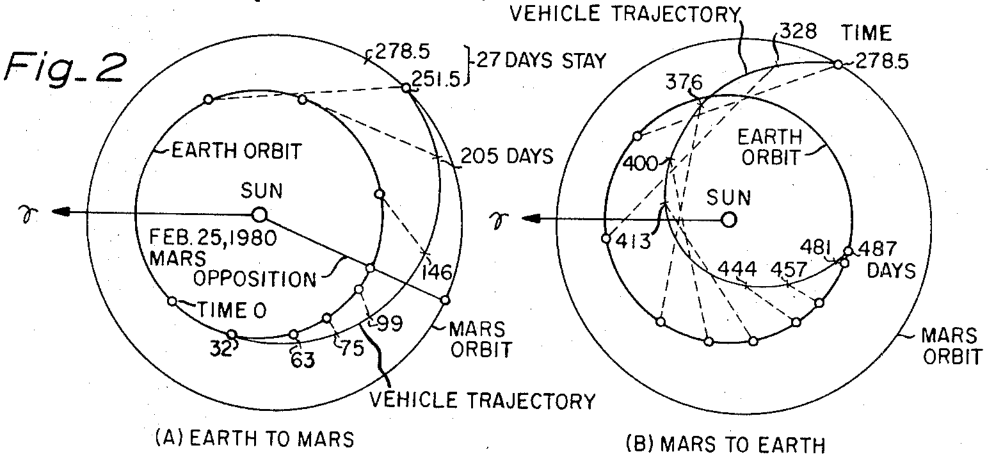
FIGS. 2A and 2B illustrate the geometry of an example space mission to Mars in the opposition of 1980.
Figure 3:
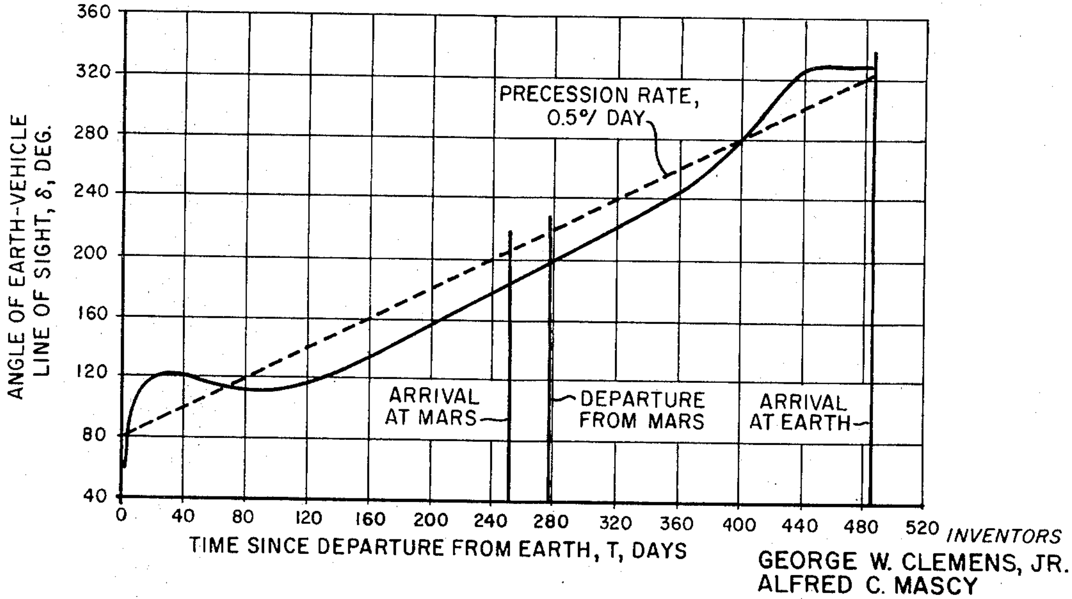
FIG. 3 is a graph illustrating the variation of the line of sight angle from Earth to the spacecraft in the example mission to Mars illustrated in FIGS. 2A and 2B.
Figure 4:
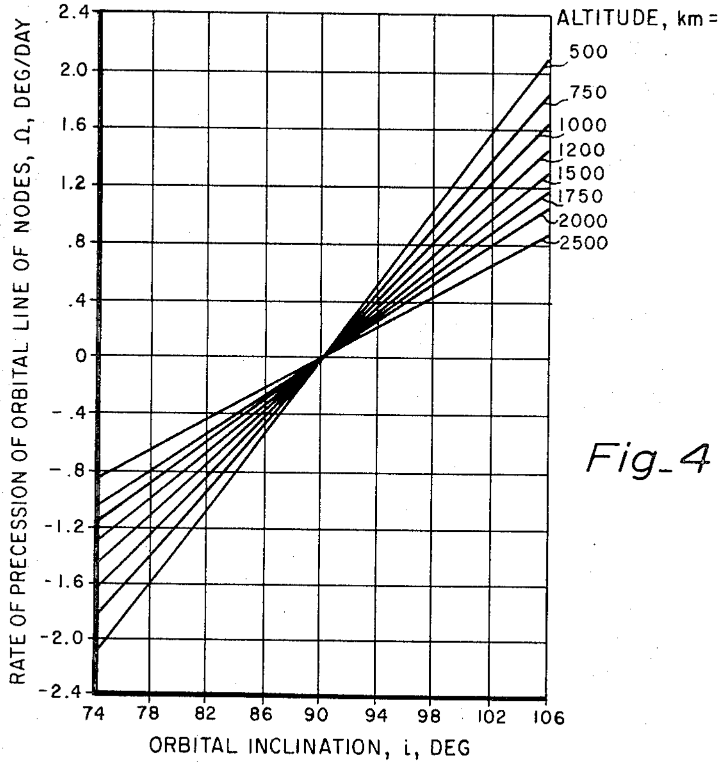
FIG. 4 is a graph illustrating the variation of the rate of precession with orbital inclination for a number of different orbital altitudes.

The geometry for a mission to Mars is shown in FIGS. 2A and 2B. The example mission is a trip for the opposition of 1980. The outbound leg of the journey lasts about 250 days, as indicated in FIG. 2A, and the inbound leg lasts about 210 days, as indicated in FIG. 2B. The stay time at Mars for this example is 27 days. The variation of sight angle $\delta$, with time for this mission is shown in FIG. 3. In FIG. 3 a line of constant slope of 0.5°/day is shown. A relay vehicle in an orbit precessing at about this rate could approximately follow the line-of-sight to an interplanetary vehicle. In such a case, the angle $\phi$, which is the component in the ecliptic plane of the required antenna look angle, is approximately the difference between the curve and the straight line. The approximations result because the orbit precesses at a constant rate in the equatorial plane rather than in the ecliptic plane. These precession rates as affected by altitude and inclination for circular orbits are shown in FIG. 4. The orbits which have precession rates of about 0.5°/day are nearly polar with inclinations about 95°. In this range of interest, altitude has secondary effects on the precession rates. As an example, an orbit with an inclination of 95°, an altitude of 1080 km., and a precession rate of 0.5°/day will be examined.

Figure 5:
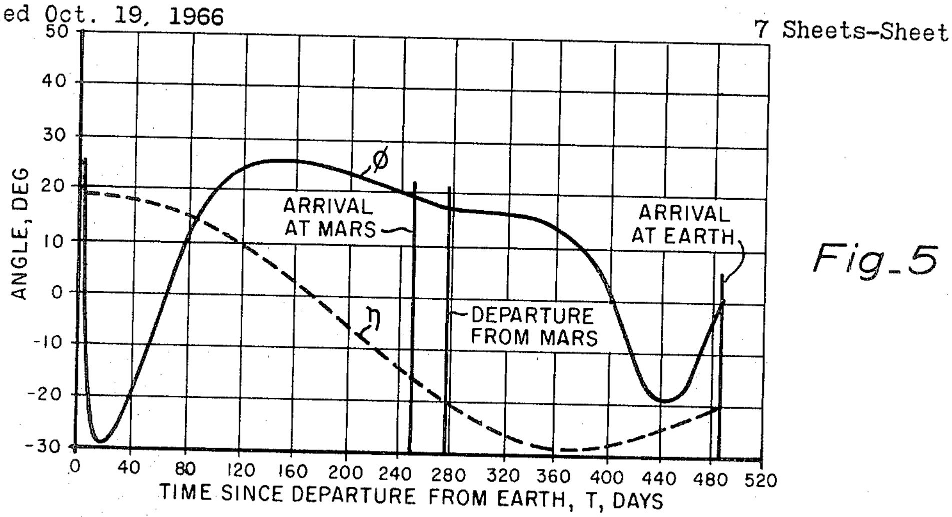
FIG. 5 is a graph illustrating the variation of the two components of the look angle during the example Mars mission.
Figure 6:
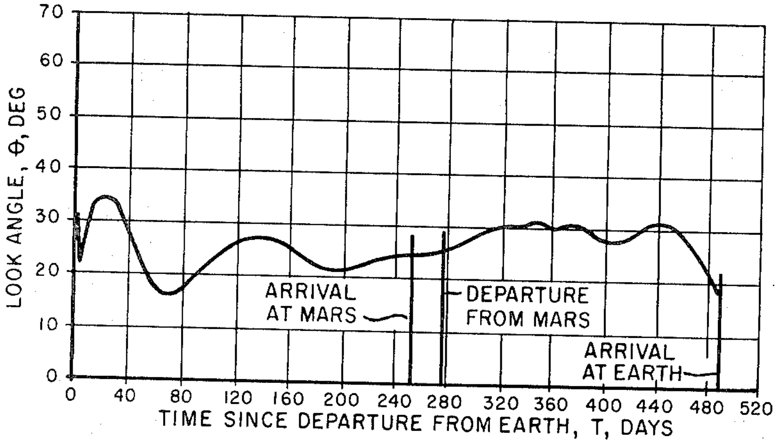
FIG. 6 is a graph illustrating the variation of the look angle itself during the example Mars mission.
Figure 7:
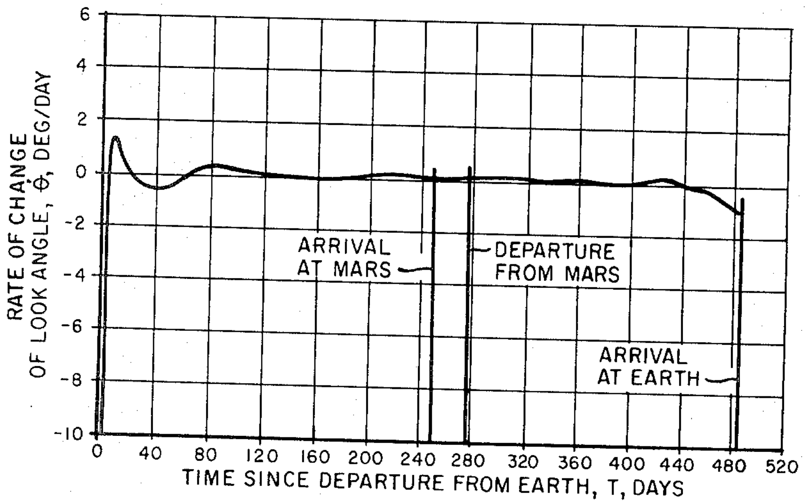
FIG. 7 is a graph illustrating the variations in the rate of change in the look angle during the example Mars mission.
Figure 8:
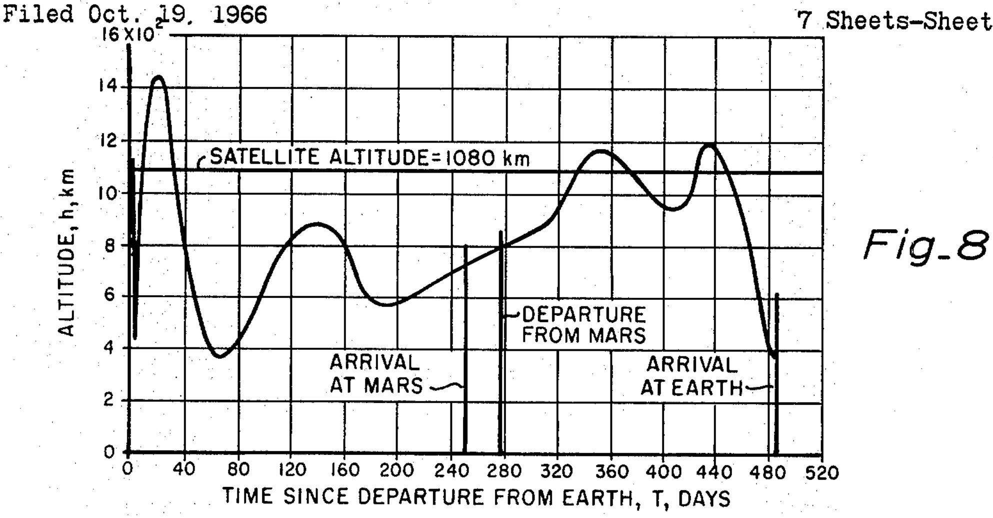
FIG. 8 is a graph illustrating the variations in the altitude required to avoid occultation by the Earth and its ionosphere during the example Mars mission, for a given orbital inclination.

For this orbit and for the example mission shown in FIG. 3, the variation of the angle $\phi$ and $\eta$ is shown in FIG. 5 and that of the vector sum, total look angle, $\theta$, in FIG. 6. The total look angle $\theta$ is the angle through which the antenna must be rotated. This angle does not exceed about 34° and changes rather slowly. For the example orbit, the rate of change of $\theta$ is shown in FIG. 7. The rate is usually less than 1°/day and for long periods it is only 0.05°/day. The maximum rotation rate is thus more than two orders of magnitude less than for an Earth-based antenna, and inertia loads would be reduced accordingly. Attitude control would not be too difficult, and the required fuel and power requirements will be examined later. It should also be noted that the important angular rates are those about axes fixed in the orbiting station, since these are the rates which must be provided by the attitude control system. In general, however, these rates should be equal to or less than the rate of change of the resultant angle $\theta$.

Another important question concerning the orbit altitude is whether or not it is sufficiently high to avoid occultation of the line-of-sight to the target vehicle by the Earth. Occultation is considered to occur if the line-of-sight to the target passes through the ionosphere. The ionosphere boundary is taken as 80 km. above the Earth.

The minimum altitude required to avoid occultation is easily determined from the angle $\theta$. The angle depends, of course, on the relative orientation of the orbit (i.e., the value of the angle $\varphi$, in FIG. 1) at the beginning of the interplanetary mission. For the example orbit and mission, the minimum altitude required to avoid occultation is shown in FIG: 8. When this altitude exceeds 1080 km., occultation occurs but only for a relatively small part of each orbit of a relay vehicle. The results show that such occultation does occur at three times, once near the beginning of the mission and twice near the end. The first occurrence is not considered important since the vehicle is still near the Earth, and tracking is not crucial at this time. The occultations late in the mission are considered important, as a relay station could be very valuable in guiding the returning vehicle to an entry corridor. There are two possibilities to remove the last two occultations; the orbit altitude can be increased or the orbit precession can be altered by applying corrective propulsion.

Figure 9:
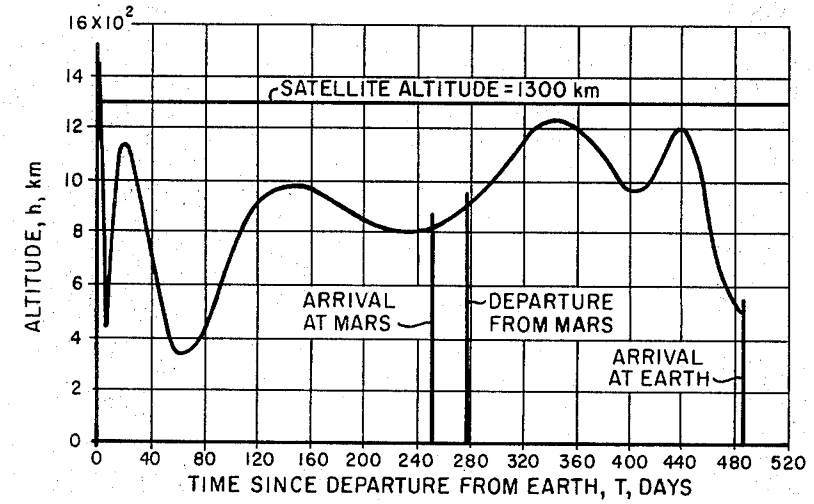
FIG. 9 is a graph illustrating the variations in the altitude required to avoid occultation by the Earth and its ionosphere during the example Mars mission, for another given orbital inclination.

The curves for an orbit with an altitude of 1300 km. and an inclination 95.4° are shown in FIG. 9. In this case, the occultation is limited to the first two days of the mission. Occultation so near the Earth on the outbound leg of the mission is not considered serious. More important is a possible weight penalty incurred by increasing the orbital altitude. However, as discussed in some detail later, the structure of the relay station provides sufficient shielding to prevent significant radiation damage to electronic components in the time period of the example mission (487 days) for altitudes well beyond 1300 km. Hence, for unmanned orbiting stations, no weight penalty results from increasing the orbital altitude from 1080 km. to 1300 km., although, of course, the launch requirements are somewhat greater for the higher altitude.

Figure 10:
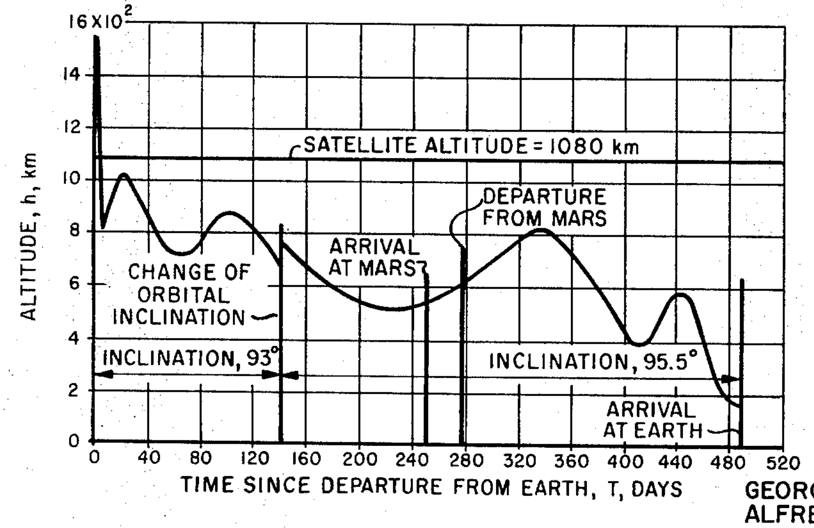
FIG. 10 is a graph illustrating the variations in the altitude required to avoid occultation by the Earth and and its ionosphere during the example Mars mission, utilizing two different orbital inclinations during the mission.

As an alternative, the possibility of altering the precession of the 1080 km. orbit was examined. The results are shown in FIG. 10. In this case, the initial inclination was taken as 93°, giving a precession rate of 0.3°/day. At 140 days, the inclination was changed to 95.5° and the precession rate became 0.55°/day. With this 2.5° plane change, occultation is avoided for all except the earliest few days. The 2.5° plane change involves a velocity increment of 0.32 km./sec. (1060 ft./sec.).

Maneuvers which would rotate the nodes of the orbit (i.e., change the right ascension of the ascending node) also have been examined and found to be somewhat more expensive than a change in inclination.

In summary, it should be mentioned that an examination of other target missions indicates that the example selected for detailed consideration is about the most severe in its tracking requirements. In addition, a study was made of orbits at altitudes between 1080 and 1300 km. In one case it was found that an orbit at 1095 km. with only a one-degree plane change resulted in occultation no more severe than the example shown in FIG. 10. The final conclusion is that relay vehicles in nearth-Earth, near-polar orbits can maintain continuous line-of-sight coverage of interplanetary spacecraft while requiring only modest orbit maneuvers and/or moderate radiation shielding.

ATTITUDE CONTROL

The primary objective of attitude control is to keep the antenna accurately and continuously pointed at a target vehicle. To accomplish this task, the antenna must be oriented in accordance with changes in the required look angle, $\theta$, and the various disturbing torques have to be counteracted.

As noted earlier, the rate of change of the look angle $\theta$ would be small, being about one degree per day only at the beginning and at the end of the example mission.

Accordingly, the accelerations would also be small being about $0.05°/(\text{day})^2$ at the ends of the mission and far less during the middle portion of the mission. To estimate the torque which would be required to supply this acceleration, the mass moments of inertia of a transmitter-relay vehicle were estimated. The approximate mass moments of inertia calculated were $I_c=34{,}000$ kg.-m.-sec.$^2$ about a central axis "c—c," and $I_g=38{,}300$ kg.-m.-sec.$^2$ about a tumbling axis "g—g." The required torque would be about $0.45\times10^{-8}$ kg.-m. As will be seen, these torques associated with changing the look angle are much less than those required to maintain the angle accurately.

At the altitudes of interest (1000–1300 km.), the predominant disturbing torques acting on an antenna are those due to the Earth's gravity gradient and internal movements of instruments, control mechanisms, etc. Due to the asymmetry of a space antenna ($I_g-I_c=4360$ kg.-m.-ec.$^2$), the Earth's gravity gradient would produce approximately 0.0032 kg.-m. of torque. This value represents an average gravity gradient torque since the magnitude would change during the mission as the latitude and longitude component of the look angle varied. An additional 0.0032 kg.-m. of torque has been estimated to include moments due to internal movements, atmospheric drag, solar radiation pressure, Earth's oblateness, micrometoroid impacts, etc. Whereas the net gravity gradient torque was taken as the root-mean-square value about two axes, the net torque due to random disturbances was taken as the R.M.S. value about two axes. Estimates indicate that the moment is very nearly the same for the 1080 km. and the 1300 km. orbits. With two thrustors for each axis 7.6 meters apart, the required thrust would be 0.403 gm.

Since the torque due to gravity gradient would be significant, the possibility of using this effect for vehicle stabilization was considered. This technique was not found to be attractive, however, primarily because an antenna must look below the horizon on one side of the orbit and above the horizon on the other. With a vehicle stabilized by gravity gradient, the antenna attitude would have to be cycled through plus and minus the look angle in each orbit revolution.

PROPULSION

The mode of propulsion adopted for this type of communications vehicle is dependent on which method of maintaining line-of-sight is used and on whether a vehicle is a transmitter-receiver-relay or simply a receiver relay. If a vehicle is designed for both transmitter and receiver relay operations, a power source of 150 electrical kilowatts would be necessary. In this case, it appears that for very little additional weight, electric thrustors could be added and low-thrust propulsion could be used with a large saving in fuel weight. As noted in the discussion on power supplies, the requirement for 150 kw. would necessite the use of nuclear power sources.

Propulsion fuel weights were estimated both for a chemical system with a specific impulse of 250 seconds and for an electric system with a specific impulse of 5000 seconds. The fuel weights associated with three requirements weer estimated. These three are the changes in look angle, the counteraction of the gravity gradient moment, and stabilization against random disturbances. In the case of the gravity gradient, the history of look angle shown in FIG. 6 was taken into account. The effective look angle for the 487-day mission used in the determination o fthis torque was 26.2°. Variations in the look angle during an orbit revolution were also considered. Random disturbances were considered to act continuously over the 487-day mission but the net torque was considered as the root mean square about the three axes. The fuel weights estimated under these assumptions are shown in the following table:

FUEL WEIGHTS FOR ATTITUDE CONTROL
[Percentage of final weight]

| Propulsion system | Medium-thrust chemical | Low-thrust electrical |
|---|---|---|
| Requirement: | | |
| Change look angle | Negligible | Negligible |
| Resist gravity gradient | 1.7 | 0.08 |
| Random disturbances | 2.0 | 0.10 |

The advantages of the electrical low thrust system are clear from this table.

COMMUNICATIONS

Prior to considering the structure of the antenna, the following theoretical material will provide an indication of the advantages of operating above the Earth's atmosphere. A simple example was selected to show the theoretical gains indicated by manipulation of the elementary transmission equation for parabolic antennas. The example selected contains two identical systems with the exception that the frequencies are different. One system is operating at 2295 mc./s. and the other system at 10,000 mc./s. The following equations apply:

$$P_R = \frac{P_T G_T G_R \lambda 2}{(4\pi R)^2}$$

where $P_R$=Power received at the receiver
$P_T$=Power from transmitter
$G_T$=Gain of a transmitting antenna
$G_R$=Gain of a receiving antenna
R=Range
λ=Wavelength Antenna gain for a parabolic antenna is $G=KA/\lambda 2$ where A=antenna area
K=antenna design constant thus $$P_r = P_T \frac{K^2 A_T A_R}{(4\pi R)^2 \lambda^2}$$

for identical antennas.

For the stated conditions:

$$P_{r_1} = \frac{P_T K^2 A_T A_R}{(4\pi R)^2 \lambda_1^2} \text{ and } P_{r_2} = \frac{P_T K^2 A_T A_R}{(4\pi R)^2 \lambda_2^2}$$

$$\frac{P_{r_2}}{P_{r_1}} = \left[\frac{(\lambda_1)}{\lambda_2}\right]^2$$

and since $\lambda = c/f$ where $f$=frequency
$c$=speed of light $$\frac{P_{r_2}}{P_{r_1}} = \left[\frac{(f_2)}{f_1}\right]^2$$

for an increase in frequency from 2295 mc. to 10,000 mc., $$\frac{P_{r_2}}{P_{r_1}} = \left[\frac{(10,000)}{2295}\right]^2 = 19.1$$

Therefore, a change in frequency alone increases the power received at the receiver 19 times. If the power at the receiver is the same in both cases, then the transmitter power can be reduced 19 times for the higher frequency.

Again, if the change of range is examined, all other parameters except frequency held constant, the range increases 4.36 times at the higher frequency.

The change in frequency to X-band or K-band appears to have advantages as shown. In addition, the existing equipment is capable of very high power operation and wide bandwidth, as well as smaller weight and volume requirements. A combination of weight-power trade-offs would permit increased communication capability for interplanetary spacecraft. For any specified system in which the example frequency change is made and all components of the system are adjusted for equivalent gains and losses, the communication bit rate increases 19 times at the higher frequency. Additional gains may also be realized from an increased efficiency of operation at high frequencies.

ANTENNA REFLECTOR

One of the most important criteria in the design of reflectors is the necessity of maintaining accurate parabolic surfaces in order to achieve the required high gain. For an orbiting antenna, these accurate surfaces must be achieved with structures which can be packaged compactly for launch. Four different structural types of antenna may be employed in the present invention:

(1) A rigid-segment, fold-out antenna;
(2) A combined metal core and inflatable outer panel;
(3) An inflatable antenna; or
(4) A rigidized structure.

For antenna dishes of any size, good focusing and efficiency are obtained when the surface irregularities do not exceed about one-twelfth of the operating wavelength, λ. For operation at 3000 mc./s., the required accuracy is ±0.83 cm. (0.33 inch) and it is ±0.25 cm. (0.16 inch) at 10,000 mc./s. With current structural techniques, the ratio of the R.M.S. surface deviation to the diameter is about $10^{-4}$. For a 25.9-meter- (85-foot-) diameter antenna, the surface inaccuracies would thus be about ±0.25 cm. (0.10 inch). It appears then that the 25.9-meter diameter antenna could be operated at frequencies up to about 10,000 mc./s. by using the λ/12 relationship.

Figure 11:
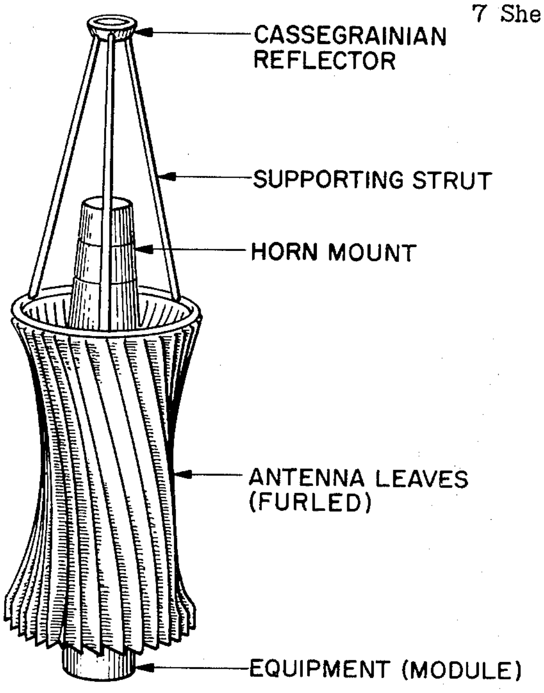
FIG. 11 is a side view of an all metal, fold-out antenna, with the antenna panel furled.

FIG. 11 shows one design for a 25.9-meter- (85-foot-) diameter, all-metal, fold-out antenna. The antenna would consist of a fixed center section 6.1 meters (20 feet) in diameter supporting a tower for a Cassegranian reflector and a short tower for use as a horn mount. Thirty panels would be folded rearward within the confines of a 6.5-meter- (21.5-foot-) diameter cylinder compatible with a Saturn-class booster. A central core 2.44 meters (8 feet) in diameter which would be available for use as an equipment module will be discussed later. The volume available in this central core would be 49.9 cubic meters (1760 cubic feet).

To evaluate panel deflection, a simple beam analysis was used. The load condition assumed was 1 g. so that the antenna would have the strength and rigidity necessary for ground testing with minimum support. This assumption is considered to be conservative since a lighter antenna could be used in space and could be ground tested with an appropriate support system. The structural material was taken to be large-celled aluminum honeycomb. It was found that, to limit deflections, the upper and lower skins should be about 0.08 cm. (0.03 inch) thick. The analysis also indicated that the skins should be tapered in thickness and that tapered supporting ribs would be required. The thicknesses of skin resulted in a unit weight of about 4.9 kg./m.² (1 lb./ft.²). With the ribs and tower structure, the total weight for the 259-meter diameter dish is estimated as 3900 kg. With the same type of construction, the weight of anetnna structures of other sizes can be approximated by $$W_a = 30.6D + 4.65D^2$$

where $W_a$ is the antenna weight in kilograms and D is the diameter in meters. When $W_a$ is in pounds and D is in feet, $W_a = 20.5D + 0.95D^2$. The first term primarily represents the weights of the tower and honeycomb while the second term accounts for skin weight.

An inflatable antenna structure has a packaging advantage, particularly when antenna diameters on the order of 61 meters (200 feet) are considered. However, some experience in industry has indicated that it is not currently possible to maintain the desired surface accuracy for diameters over 12 meters (40 feet). In order to provide some indication of the reduction in weight that could be obtained by the use of an inflatable structure, a combined rigid and inflatable structure was considered. By retaining a central rigid core, a 25.9-meter diameter can be achieved with an inflatable outer section having a radial dimension of about 10 meters (34 feet). A double surface structure with ribs 1.5 meters (5 feet) deep at the root was chosen as a design concept. For an antenna of 25.9-meter diameter (557 square meters—6000 square feet), the all-metal rigid antenna has an estimated unit structural weight of 6.8 kg. per square meter (1.4 pounds per square foot), whereas the combined inflatable structure has a unit weight of about 4.9 kg. per square meter (1.0 pound per square foot).

EQUIPMENT MODULE

The equipment module forms the structural backbone for an antenna-vehicle of the present invention. It would be cylindrical in shape about 2.44 meters (8 feet) in diameter and 10.7 meters (35 feet) long. The antenna, during launch and flight through the atmosphere and prior to deployment, would be in a furled and stowed arrangement along the cylindrical surface of the equipment module. One end of the module would be the attachment to the booster and the other end would serve as the antenna base and attachment point for the receiver horn structure. The launch arrangement for the vehicle would be similar in either its receiver-relay or transmitter-receiver-relay configurations. A windshield would protect the antenna from the aerodynamic noise and buffeting loads during launch and flight through the Earth's atmosphere. It would be separated from the spacecraft early during second stage booster burning. The antenna would be erected when the vehicle is at its operational altitude.

Figure 12:
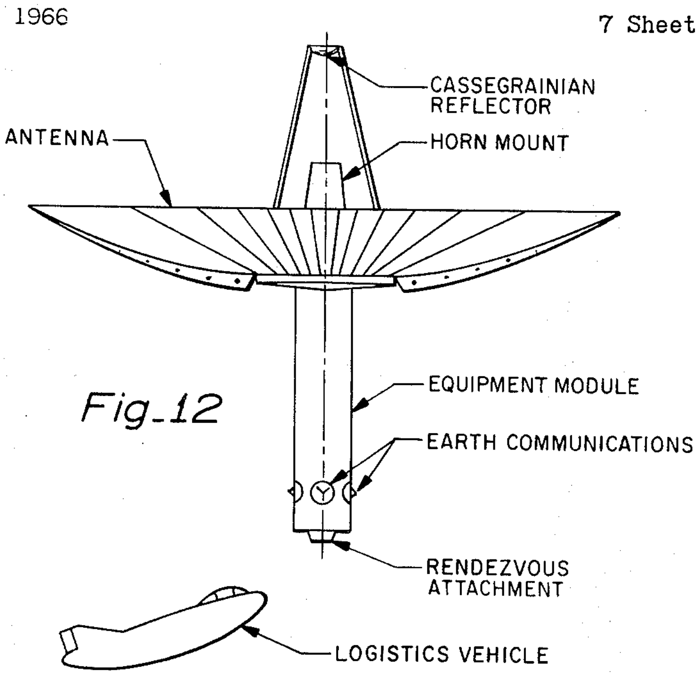
FIG. 12 is a side view of a receiver-relay satellite configuration in accordance with this invention, with the antenna in operational position.

FIG. 12 shows a vehicle in its operational arrangement as a receiver-relay. Four Earth communications antennas are mounted at 90° positions on the base of the cylindrical portion, and the primary and secondary attitude control and orbit plane change motors are locatel at the ends of the equipment module. The structure of this module consists of a monocoque-type meteoroid shield and a honeycomb reinforced and insulated inner pressure vessel. The module has a structural weight of about 10 kg. per square meter (2 pounds per square foot). The pressure vessel inner structure would allow the equipment module to be pressuribed during regular periods of check-out, maintenance, and resupply. This capability would allow "shirt-sleeve" conditions for the maintenance crew.

A rendezvous attachment device may be located at the base of the equipment module. Maintenance and resupply may be effected at this point with a logistics vehicle similar to the one shown. The module need not be pressurized during normal operation in order to assist in heat rejection from the operating equipment. Temperature control within the module may be accomplished by a passive system employing conduction through the module structure.

All the equipment necessary for the operation of a study vehicle is contained within the equipment module. This equipment includes a radioistope electrical power supply, communications components, and propellant tankage. The communications components are arranged in such a manner as to afford ready access for maintenance or modular replacements of units even by crews encumbered by space suits. The module has a volume of about 57 cubic meters (2000 cubic feet) and an internal head room diameter of 2 meters (7 feet).

Figure 13:
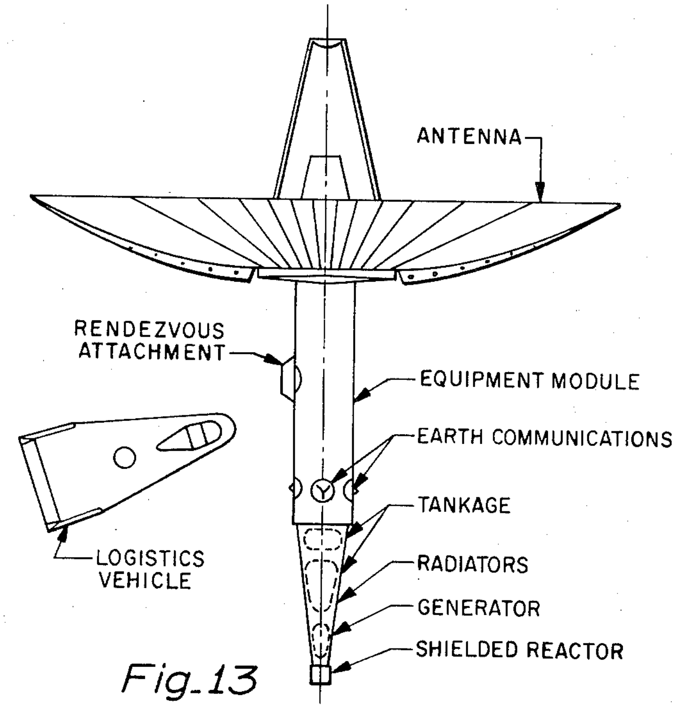
FIG. 13 is a side view of a transmitter-receiver relay satellite configuration in accordance with this invention, with the antenna in operational position.

FIG. 13 shows an operational arrangement for a transmitter-receiver-relay vehicle. The equipment module and 25.9-meter diameter antenna are similar to the receiver-relay vehicle; however, the greater power demand requires a nuclear-reactor power supply, generator and radiators. The reactor unit may be shadow shielded to protect the equipment module and the active antenna components. During periods of logistics supply, the reactor power may be greatly reduced and thus a moderate amount of shielding on the reactor sides would protect the logistics vehicle crew during approach and departure maneuvers. With this configuration, the rendezvous attachment location is on the cylindrical portion of the equipment module. The coolant-radiator conical structure supports the generator, reactor and shielding, and the radiators are of sufficient area to fulfill the cooling requirements for both the reactor and the communications equipment. Supplemental attitude-control and orbit change fuels are stored within the radiator structure.

POWER SUPPLY

The power requirements are dictated by the type of communication system employed and the source of power in turn is governed by the application. Unmanned receiver-relay stations require only a minimum of power for reception (75 to 100 watts) and a nominal one kilowatt peak capacity for periodic transmission to Earth. An additional 150 watts should be provided to satisfy spacecraft needs such as those resulting from gyroscopes, instrumentation, attitude control mechanism including star trackers and any necessary pumping for thermal control of the prime power source and/or for focal-point cooling. Accordingly, the power requirements for an unmanned receiver-relay station are estimated to be a total of 250 watts for continuous operation, with separate provisions for 1000 watts for short duration transmission of stored data to Earth via 1.2-meter (4-foot) parabolic antennas.

Among the possible power sources are solar cells and radioisotopes. Solar cell panels present a large area vulnerable to micrometeorods and would also require constant orientation to the Sun. In addition to the attitude control problems, it would be necessary to establish an orbit which would be simultaneously and constantly in view of both the Sun and an interplanteary vehicle. For these reasons, radioisotopes are considered preferable as the primary source of power. Among the advantages of these power sources are compactness and the reliability demonstrated by the years of operation of SNAP–9A power sources aboard the Transit satellites.

The requirement for 250 watts of continuous power can be met by multiple SNAP–9A units. Ten units would be required having a total weight about 114 kg. (250 pounds). Power for relay transmission to Earth could be obtainable from a silver-cadmium ceramic-sealed secondary battery. To provide power for one hour of relay transmission per day (i.e., 1000 watt-hours) during a 50-percent discharge, the battery would weigh about 34 kg. (75 pounds). With a 50-percent discharge once a day and at 25° centigrade, this battery has a life of 600 cycles.

Power requirements for a transmitter-receiver-relay station would be much greater. The present DSIF system transmits 10 kilowatts now and plans exist to increase this power to 100 kilowatts. In the present invention, a transmitted power of 30 kilowatts in lieu of 100 kw. was assumed to be adequate for use in transmitting to the example mission in the vicinity of Mars. With an efficiency of 20 percent, an electrical input power of 150 kilowatts would be required. This magnitude of power can be realized for space applications by the use of nuclear reactors.

A nuclear reactor of approximately 0.8 thermal megawatts could provide the heat for a turbo-generator system. It would require about 28 square meters (300 square feet) of radiators to dissipate the waste heat. It is estimated that such a power source would weigh approximately 10 to 15 kg. (25 to 30 pounds) per kilowatt with an additional 3.18 kg. (7 pounds) per kilowatt for radiation shielding; the total weight is estimated to be 2520 kg. (5550 pounds).

MICROMETEOROID HAZARD

The penetration theory developed by others was used together with an earlier estimate of the particle flux to determine the possible micrometeoroid hazard to an orbiting antenna. The structural material of the antenna was taken as aluminum 0.081 cm. in thickness. If the diameter is taken as 26 m., the total exposed area of the antenna dish, front and back, is 1121 m.$^2$. For the typical mission time of 487 days, approximately 1750 penetrations might occur. This number corresponds to 3.6 penetrations per day. It may also be shown that the diameters of these punctures are less than 0.03 cm.

It therefore appears that micrometeoroids present negligible structural and operational problems to the antenna reflector itself. Likewise, the present analysis indicates that the structure of the equipment module described above provides adequate protection of electronic components and othed equipments against damage from micrometeoroids. On the other hand, all radiators required for thermal control must be protected.

RADIATION SHIELDING

Others have predicted radiation doses that would be received behind various shielding configurations while orbiting the Earth at different altitudes and inclinations. This work took into consideration the effects of trapped protons and electrons (including bremsstrahlung) and solar protons.

This effort has been extended for a range of altitudes of interest to this invention in the case of simple spherical shields of 10 and 20 g./cm.$^2$ of aluminum. The results in terms of rads/day received as a result of the trapped radiation are shown in the first table below. The second table shows the results in rads/duration of flare for various solar-proton events.

TRAPPED RADIATION DOSE [1] FOR ORBIT INCLINATION=90°

| Shielding | Primary proton dose 10 g./cm.$^2$ | Primary proton dose 20 g./cm.$^2$ | Primary electron dose, both cases | Bremsstrahlung dose 10 g./cm.$^3$ | Bremsstrahlung dose 20 g./cm.$^2$ | Total dose 10 g./cm.$^2$ | Total dose 20 g./cm.$^2$ |
|---|---|---|---|---|---|---|---|
| Orbit altitude: | | | | | | | |
| 900 km | 1.6 | 0.83 | 0 | 0.54 | 0.44 | 2.1 | 1.3 |
| 1080 km | 3.1 | 1.5 | 0 | 0.93 | 0.74 | 4.0 | 2.3 |
| 1300 km | 6.2 | 3.2 | 0 | 3.8 | 3.1 | 10.0 | 6.3 |
| 1500 km | 11.2 | 5.7 | 0 | 8.0 | 6.7 | 19.2 | 12.4 |

[1] Dose units are rad/day.

LAUNCH-VEHICLE REQUIREMENTS

The launch-vehicle requirements for an orbiting relay station depend upon the total weight of the vehicle, upon the characteristics of its orbit, and upon the location of the launch site. As discussed above, the weights are affected by numerous considerations. These weights are summarized in the following table. Unmanned stations might weigh approximately 5,800 to 6,700 kg. if intended for relay functions only, and from 9,300 to 11,00 kg., if facility for transmission is added.

EFFECTIVE ORBITAL WEIGHTS, kg.

[26 m. diameter antenna]

| Altitude | Method of attitude control and orbital changes | Weight condition | Receiver relay unmanned | Unmanned | Manned (shielded) |
|---|---|---|---|---|---|
| 1,080 km. orbit | Chemical propulsion. | Dry | 5,600 | 9,250 | 37,500 |
| | | Propellant | 1,060 | 1,750 | 7,090 |
| | | Total | 6,660 | 11,000 | 44,590 |
| 2.5° plane change | Electrical propulsion. | Dry | | 9,250 | 37,500 |
| | | Propellant | | 110 | 450 |
| | | Total | | 9,360 | 37,950 |
| 1,300 km. orbit | Chemical propulsion. | Dry | 5,600 | 9,250 | 87,700 |
| | | Propellant | 215 | 355 | 3,370 |
| | | Total | 5,815 | 9,615 | 91,070 |
| No plane change | Electrical propulsion. | Dry | | 9,250 | 87,700 |
| | | Propellant | | 17 | 158 |
| | | Total | | 9,267 | 87,858 |

Figure 14:
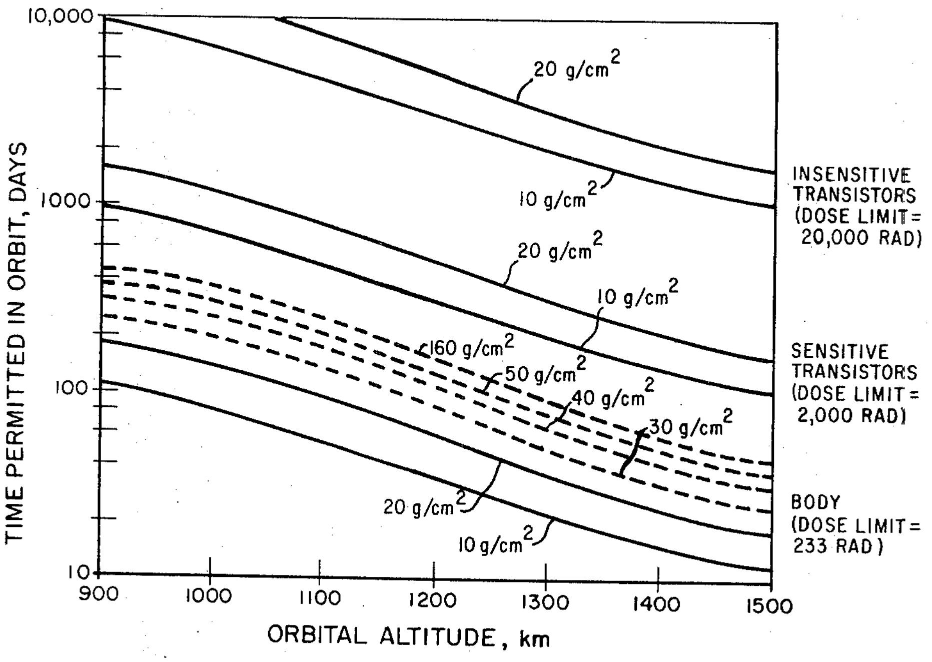
FIG. 14 is a graph illustrating the number of days permitted in circular 90 degree orbits at different altitudes for different shield thicknesses and total base limitations.

From the data in the first table, the number of days permitted in circular 90° orbits at various altitudes can be calculated for different aluminum shield thicknesses and different total dose limitations. These relationships are illustrated in FIG. 14. Dashed curves indicate extrapolations to greater values of shielding. The dose limitations shown were chosen because they represent biological or equipment exposure limits. Recently defined NASA average yearly dose limits for humans include 27 rads for eyes and 233 rads at the surface of the outer skin of the entire body.

A nonsensitive type transistor would require no more shielding than is furnished by the structure of the equipment module (1 g./cm.$^2$) to survive for 500 days at altitudes up to 1500 km.

From the solar-flare data given in the second table it is deduced that the total dosage received from even several flares with a specified shielding (e.g., 10 g./cm.$^2$) at altitudes of interest here (1000 to 1300 km.) during any 90 day period is likely to be about 10 percent or less than the dosage received from the high-energy trapped particles of the radiation belts (i.e., about 50 to 60 rads compared with nearly 550 rads).

SOLAR-FLARE PROTON DOSE:[1] INCLINATION=90°

| Orbit shielding | Altitude=1,500 km. 10 g./cm.$^2$ | Altitude=1,500 km. 20 g./cm.$^2$ | Altitude=400 km. 10 g./cm.$^2$ | Altitude=400 km. 20 g./cm.$^2$ |
|---|---|---|---|---|
| Flare: | | | | |
| Feb. 23, 1956 duration=7.77×10$^5$ sec.) | 18.8 | 9.2 | 18.4 | 9.0 |
| July 14, 1959 duration=5.11×10$^5$ sec.) | 7.8 | 1.7 | 7.4 | 1.6 |
| Nov. 12, 1960 duration=4.89×10$^5$ sec.) | 15.6 | 5.48 | 15.2 | 5.3 |

[1] Dose units are rad/duration of flare.

From the range of weights estimated for the various types of radio stations considered, the launch-vehicle capabities required to place these weights into the desired orbits lie between those of such launch vehicles as Titan III–C and Saturn I–B. Because of range safety considerations, the usable launch azimuths from launch facilities at Cape Kennedy cannot exceed 160°. For the example mission to Mars, initial orbital inclinations of 93° to 95° were cited; the corresponding launch azimuths are nearly 184° and 186°. Hence, dog-leg trajectories are required in launching the communications station from Cape Kennedy. For launches from the facilities at the west-coast launch site, no dog-leg maneuver would be required. However, at present, the Saturn launch vehicles cannot be accommodated at the west-coast site. Use of the Titan III–C vehicle might require a reduction in the diameter of the launch configuration of the communications station from 6.5 m. considered necessary in the case of the 26-m. antenna, to nearly 3 m.

Figure 15:
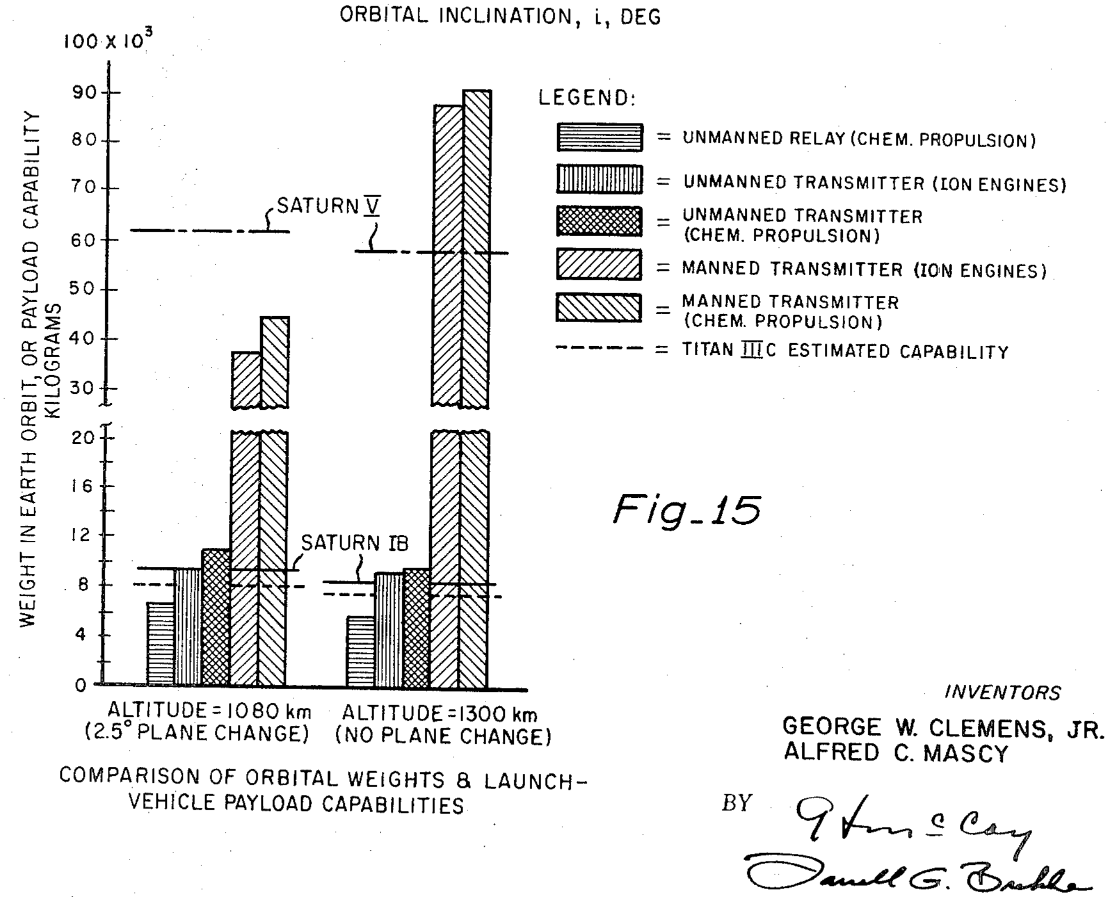
FIG. 15 is a series of graphs comparing different orbital weights and launch-vehicle payload capabilities.

A summary of launch-vehicle requirements for placing several types of communications satellites into one or another of two prescribed orbits is given in FIG. 15. The corresponding payload capabilities of three different launch vehicles are indicated in the figure. In the case of the Titan III–C, launch from the Pacific Missile Range was assumed, with no restrictions on the launch azimuth; for the other two vehicles, a dog-leg maneuver entailing a yawing of the second stage was assumed to take into account a restriction to 160° in launch azimuth required at the Atlantic Missile Range.

From the above description, it will be seen that there has been provided a noved deep space communication system employing a single Earth-orbiting satellite in a near-polar obit. By utilizing such a satellite at an altitude where atmospheric effects are negligible or non-existent, considerably higher frequencies may be employed. This, in turn, results in reduced weight and volume, increased bandwidth for increased communication capability, increased range of operation, and increased space vehicle capability for all missions.

Figure 16:
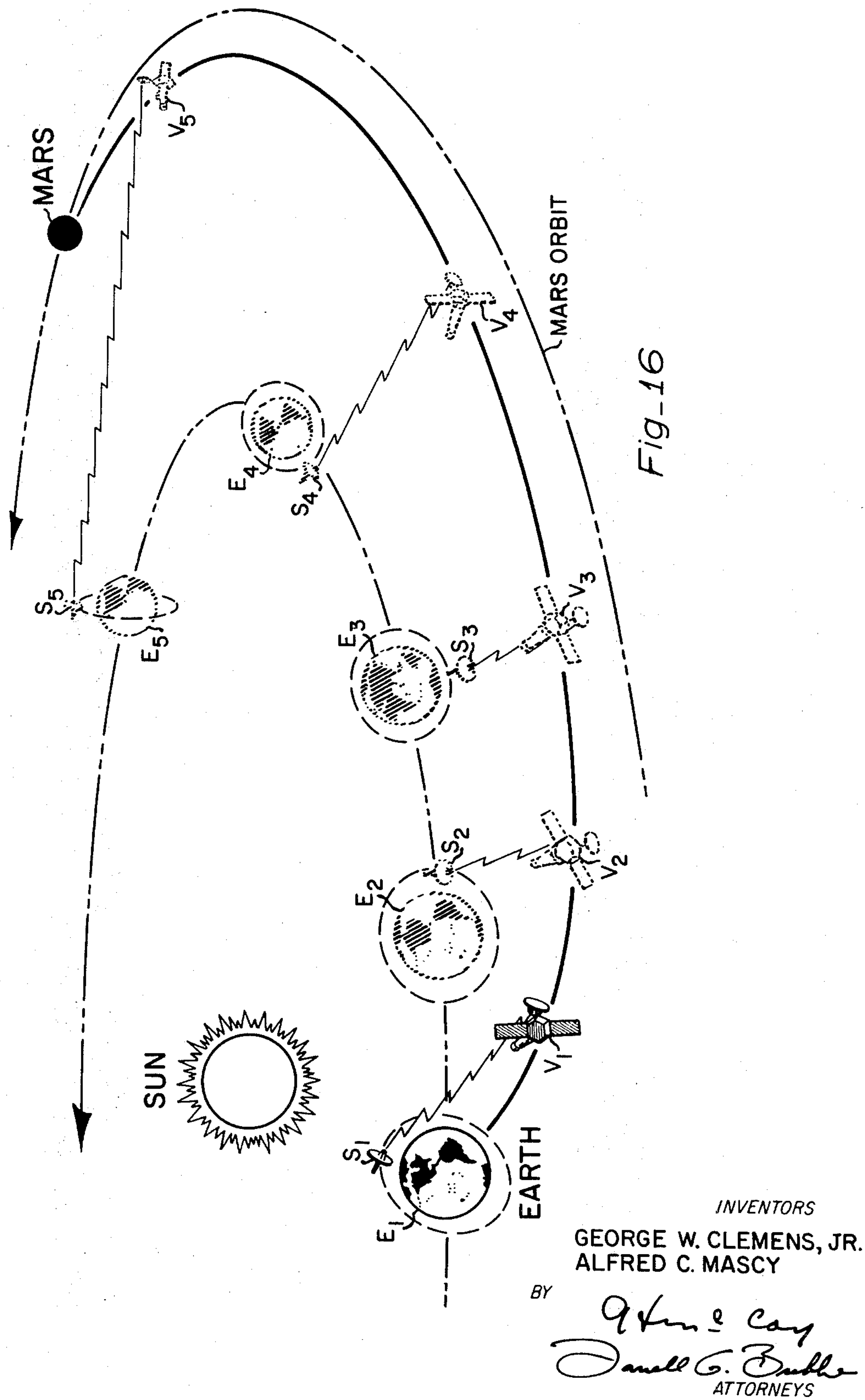
FIG. 16 is a pictorial representation of a portion of the Earth-to-Mars trip shown geometrically in FIG. 2A, showing different orbital positions of the satellite during the trip.

FIG. 16 illustrates pictorially the operation of the present invention in a portion of the Earth-to-Mars trip which was illustrated geometrically in FIG. 2A. In FIG. 16, different orbital positions of the Earth are represented by $E_1$, $E_2$, $E_3$, $E_4$ and $E_5$, while the corresponding positions of the spacecraft or vehicle travelling to Mars are represented by $V_1$, $V_2$, $V_3$, $V_4$ and $V_5$. Any suitable type of space vehicle may be employed, and in FIG. 16 a Mariner-type craft is illustated. A number of different orbital positions of the satellite in accordance with this invention are shown at $S_1$, $S_2$, $S_3$, $S_4$ and $S_5$ for the different positions of the Earth as it orbits about the sun. From FIG. 16 it will be seen that regardless of the orbital position of the satellite relative to the Earth, it is able to maintain communication with the space vehicle, with no interference because of occultation by Earth or its atmosphere.

When the present invention is used for radio and radar astronomy, vastly greater spectrum coverage is possible and studies of certain areas of the universe are possible because Earth rotation does not affect the viewing time. Further, the present invention may be employed in the search for galactic intelligence and in attempts to communicate with other intelligent systems, since the invention provides essentially unlimited frequency coverage and the capability to continuously aim at one point in space.

Additionally, as a navigational beacon for a returning spacecraft, the present invention may be employed. When a spacecraft returns to Earth from a space mission, difficulties are encountered in using Earth-based radio stations for determining the entrance corridor. At present, a returning spacecraft can see only one DSIF (Deep Space Instrumentation Facility) tracking station at a time and triangulation is thwarted. Even if more tracking stations are later provided, the base line between two stations will be relatively short to a returning spacecraft. Further, the atmospher of Earth restricts the frequencies available for communications. The present invention may be utilized as a navigational beacon to aid spacecraft returning to Earth. The transmitting apparatus of the satellite may be used to send a beacon signal to the spacecraft. The signal may be sent over a second channel if desired. The satellite may, for example, be used as a transponder, sending a pulsed signal to the spacecraft in response to a burst from the spacecraft. Inasmuch as a continuous communication is possible between the spacecraft and the satellite, approach velocity as well as position may readily and continuously be determined. The triangulation may be as large as the largest dimension of the orbit.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A system for communicating between Earth and an electromagnetic radiation source in deep space comprising:

a single satellite orbiting the Earth in an orbit at an altitude, inclination and ellipticity to prevent occultation of the electromagnetic radiation source by the Earth and its atmosphere;

directional antenna means mounted on said satellite for receiving electromagnetic radiation from deep space; and transceiver means mounted on said satellite for communication between said satellite and the Earth.

2. Apparatus in accordance with claim 1 in which said orbit of said satellite precesses at a predetermined rate which corresponds approximately with the variation in the line of sight between said satellite and the electromagnetic radiation source in deep space.

3. Apparatus in accordance with claim 1 wherein said directional antenna means includes control means for maintaining said antenna means directed at a given electromagnetic radiation source in space.

4. A system for communicating between Earth and an electromagnetic source in deep space comprising:

a single satellite orbiting the Earth in an orbit at an altitude, inclination and ellipticity to prevent occultation of the electromagnetic radiation source by the Earth and its atmosphere;

first transceiver means mounted on said satellite for communicating between said satellite and the Earth;

second transceiver means mounted on said satellite for communicating between said satellite and an electromagnetic radiation source, said second transceiver means including a directional antenna;

attitude control means for varying the attitude of said satellite to maintain said directional antenna means directed at a given electromagnetic radiation source in space.

5. Apparatus in accordance with claim 4 in which said orbit of said satellite precesses at a predetermined rate which corresponds approximately with the variation in the line of sight between said satellite and the electromagnetic radiation source in deep space.

6. A navigational system for a vehicle in deep space, comprising:

a single satellite orbiting the Earth in an orbit at an altitude, inclination and ellipticity to prevent occultation of said vehicle by the Earth and its atmosphere; and transponder means mounted on said satellite for communicating between said satellite and said vehicle.

7. A beacon system for providing navigational information to a vehicle in deep space, comprising:

a single satellite orbiting the Earth in an orbit at an altitude, inclination and ellipticity to prevent occultation of said vehicle by the Earth and its atmosphere;

transponder means mounted on said satellite for transmitting signals to said vehicle in deep space upon receipt of interrogation signals, said means including a directional antenna; and control means for varying the attitude of said satellite to maintain said antenna directed at said vehicle.

8. A communication system for communicating between Earth and an electromagnetic radiation source in deep space, comprising:

a single satellite orbiting the Earth in a circular near-polar orbit which lies below the Van Allen radiation belt but has an altitude sufficiently high to prevent occultation of the electromagnetic radiation source by the Earth and its atmosphere;

first directional antenna means mounted on said satellite for receiving electromagnetic radiation from deep space;

second antenna means mounted on said satellite for communication between said satellite and the Earth;

attitude control means in said satellite for varying the attitude of said satellite to thereby vary the bearing of said first directional antenna means; and means for periodically actuating said attitude control means to vary the attitude of said satellite to maintain said first directional antenna means directed at a given radiation source in space.

9. Apparatus in accordance with claim 8 in which said orbit of said satellite precesses at a predetermined rate which corresponds approximately with the variation in the line of sight between said satellite and the electromagnetic radiation source in deep space.

10. Apparatus in accordance with claim 8 in which the inclination of said orbit is approximately 95 degrees and the altitude of said orbit is 1080 kilometers.

11. Apparatus in accordance with claim 8 in which said satellite is to communicate with a spacecraft traveling from Earth to Mars and return, including means for varying the inclination of said satellite orbit at a predetermined point in the travel of said spacecraft from Earth to Mars.

12. Apparatus in accordance with claim 11 in which the inclination of said orbit during the first portion of said travel is 93 degrees, the inclination of said orbit during the second portion of said travel is 95.5 degrees, and the altitude of said satellite orbit is 1080 kilometers.

13. A communication system for communicating between Earth and a vehicle in deep space, comprising:

a single satellite orbiting the Earth in a circular near-polar orbit which lies below the Van Allen radiation belt but has an altitude sufficiently high to prevent occultation of said vehicle by the Earth and its atmosphere, the rate of precession of said satellite orbit corresponding approximately to the variation in the line of sight between said satellite and said vehicle in deep space;

first directional antenna means mounted on said satellite for receiving communications from deep space, said antenna means having a furled position on said satellite during launch and having an unfurled, operative position when said satellite is in said orbit;

second antenna means mounted on said satellite for communication between said satellite and the Earth;

attitude control means in said satellite for varying the attitude of said satellite in said orbit to vary the bearing of said first directional antenna means; and means for periodically actuating said attitude control means to maintain said first directional antenna means directed at said vehicle moving in deep space.

14. Apparatus in accordance with claim 13 including third directional antenna means for transmitting from said satellite to said vehicle in deep space.

15. Apparatus in accordance with claim 14 in which said satellite is to communicate with a spacecraft traveling from Earth to Mars and return, including means for varying the inclination of said satellite orbit at a predetermined point in the travel of said spacecraft from Earth to Mars.

16. Apparatus in accordance with claim 15 in which the inclination of said satellite orbit during the first portion of the travel from Earth is 93 degrees, the inclination of said orbit during the second portion of said travel is 95.5 degrees, and the altitude of said orbit is 1080 kilometers.

References Cited

UNITED STATES PATENTS

| | | | |
|---|---|---|---|
| 3,064,534 | 11/1962 | Tumavicus. | |
| 3,116,484 | 12/1963 | Cutler. | |
| 3,176,303 | 3/1965 | Holland | 343—915 |
| 3,384,891 | 5/1968 | Anderson. | |

OTHER REFERENCES

W. Victor et al., "Instrumentation Aspects of the Mars Mission," Advances in the Astronautical Sciences, vol. 15, pp. 373–388. TL 787.A3.

RODNEY D. BENNETT, Jr., Primary Examiner

R. E. BERGER, Assistant Examiner

U.S. Cl. X.R.

244—1; 325—4, 14, 15; 343—915